(12) United States Patent
Yang

(10) Patent No.: US 11,240,869 B2
(45) Date of Patent: Feb. 1, 2022

(54) DISCONTINUOUS RECEPTION METHOD AND DEVICE

(71) Applicant: GUANGDONG OPPO MOBILE TELECOMMUNICATIONS CORP., LTD., Guangdong (CN)

(72) Inventor: Ning Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/468,536

(22) PCT Filed: Dec. 16, 2016

(86) PCT No.: PCT/CN2016/110534
§ 371 (c)(1),
(2) Date: Jun. 11, 2019

(87) PCT Pub. No.: WO2018/107498
PCT Pub. Date: Jun. 21, 2018

(65) Prior Publication Data
US 2020/0092936 A1  Mar. 19, 2020

(51) Int. Cl.
*H04W 76/28* (2018.01)
*H04L 1/18* (2006.01)
*H04W 28/02* (2009.01)

(52) U.S. Cl.
CPC .......... *H04W 76/28* (2018.02); *H04L 1/1819* (2013.01); *H04L 1/1861* (2013.01); *H04L 1/1896* (2013.01); *H04W 28/0268* (2013.01)

(58) Field of Classification Search
USPC .......................................................... 370/329
See application file for complete search history.

(56) References Cited

U.S. PATENT DOCUMENTS

| 8,582,483 B1 | 11/2013 | Yu et al. |
| 8,971,228 B2 | 3/2015 | Yu et al. |

(Continued)

FOREIGN PATENT DOCUMENTS

| CN | 101925161 A | 12/2010 |
| CN | 102595573 A | 7/2012 |

(Continued)

OTHER PUBLICATIONS

Notice of Allowance of the Russian application No. 2019122187, dated Dec. 12, 2019.

(Continued)

*Primary Examiner* — Gregory B Sefcheck
*Assistant Examiner* — Majid Esmaeilian
(74) *Attorney, Agent, or Firm* — Ladas & Parry LLP

(57) ABSTRACT

Provided in the embodiments of the application are a Discontinuous Reception (DRX) method and device. The method includes that: a terminal device determines a first service type, the first service type being a service type of a service which is being transmitted between the terminal device and a network device; the terminal device determines a first length according to the first service type; and the first length is determined by the terminal device as a length of a timer for DRX of the first service type. According to the DRX method and device of the embodiments of the application, the length of the timer for DRX may be flexibly configured, and a signaling overhead is reduced.

8 Claims, 5 Drawing Sheets

(56) References Cited

U.S. PATENT DOCUMENTS

| | | | |
|---|---|---|---|
| 2013/0182626 A1* | 7/2013 | Kuo | H04W 52/02 370/311 |
| 2013/0215809 A1* | 8/2013 | Chang | H04W 52/0235 370/311 |
| 2014/0003316 A1 | 1/2014 | Yu et al. | |
| 2014/0105010 A1 | 4/2014 | Fang | |
| 2016/0112084 A1 | 4/2016 | Parron et al. | |
| 2016/0212794 A1* | 7/2016 | Szabo | H04W 52/0206 |
| 2016/0295462 A1* | 10/2016 | Lunden | H04W 36/0055 |
| 2016/0345379 A1* | 11/2016 | Bergquist | H04W 76/28 |
| 2017/0295608 A1 | 10/2017 | Li et al. | |
| 2018/0115392 A1* | 4/2018 | Yang | H04W 24/02 |
| 2018/0249513 A1* | 8/2018 | Chang | H04W 48/14 |
| 2021/0194703 A1* | 6/2021 | Queralt | H04W 12/069 |

FOREIGN PATENT DOCUMENTS

| | | |
|---|---|---|
| CN | 102833833 A | 12/2012 |
| CN | 103109570 A | 5/2013 |
| CN | 103997773 A | 8/2014 |
| CN | 105813177 A | 7/2016 |
| CN | 105813177 A | 7/2016 |
| CN | 105933064 A | 9/2016 |
| JP | 2007053628 A | 3/2007 |
| RU | 2558747 C2 | 8/2015 |

OTHER PUBLICATIONS

English translation of the Written Opinion of the International Search Authority in the international application No. PCT/CN2016/110534, dated Aug. 30, 2017.

Supplementary European Search Report in the European application No. 16923723.7, dated Sep. 6, 2019.

Intel Corporation: "Dynamic C-DRX configuration in NR", 3GPP Draft; R2-168532 Dynamic C-DRX, 3rd Generation Partnership Project (3GPP), Mobile Competence Centre ; 650, Route Des Lucioles ; F-06921 Sophia-Antipolis Cedex ; France, vol. Ran WG2 , no. Reno, Nevada, USA; Nov. 14, 2016-Nov. 18, 2016 Nov. 13, 2016 (Nov. 13, 2016), XP051178113, Retrieved from the Internet: URL:http://www.3gpp.org/ftp/Meetings_3GPP_SYNC/RAN2/Docs/ [retrieved on Nov. 13, 2016] * the whole document *.

Samsung: "Way forward for NR C-DRX", 3GPP Draft; R2-167902, 3rd Generation Partnership Project (3GPP), Mobile Competence Centre ; 650, Route Des Lucioles ; F-06921 Sophia-Antipolis Cedex ; France, vol. Ran WG2 , no. Reno, Nevada, USA; Nov. 14, 2016-Nov. 18, 2016 Nov. 13, 2016 (Nov. 13, 2016), XP051177644, Retrieved from the Internet: URL:http://www.3gpp.org/ftp/Meetings_3GPP_SYNC/RAN2/Docs/ [retrieved on Nov. 13, 2016] * the whole document *.

International Search Report in international application No. PCT/CN2016/110534, dated Aug. 30, 2017.

Written Opinion of the International Search Authority in international application No. PCT/CN2016/110534, dated Aug. 30, 2017.

First Office Action of the Brazilian application No. BR1120190120637, dated Sep. 24, 2020.

Second Office Action of the European application No. 16923723.7, dated Oct. 2, 2020.

First Offiee Action of the Japanese application No. 2019-532085, dated Oct. 27, 2020.

Second Office Action of the Japanese application No. 2019-532085, dated Feb. 19, 2021.

First Office Action of the Indian application No. 201917026645, dated Jan. 14, 2021.

First Office Action of the Chinese application No. 201680091663.6, dated Jun. 30, 2021.

Third Office Action of the European application No. 16923723.7, dated May 20, 2021.

First Office Action of the European application No. 16923723.7, dated Jan. 28, 2020.

* cited by examiner

DISCONTINUOUS RECEPTION METHOD AND DEVICE

RELATED APPLICATION

This application is an application under 35 U.S.C. 371 of International Application No. PCT/CN2016/110534 filed on Dec. 16, 2016, the entire contents of which are incorporated herein by reference.

TECHNICAL FIELD

The application relates to the field of communication, and more particularly to a Discontinuous Reception (DRX) method and device in the field of communication.

BACKGROUND

For reducing an overhead in state switching during service mode changing, an intermediate state, i.e., an active DRX mechanism, is introduced into Long Term Evolution (LTE). The active DRX mechanism allows a terminal device to be periodically switched between a sleep state and an active state under a condition of keeping a Radio Resource Control (RRC) connection. The active DRX mechanism divides a connected state of the terminal device into an active state stage and a sleep state stage. When the terminal device is in the active state stage, a receiving antenna of the terminal device is turned on to enable the terminal device to receive a Downlink (DL) data packet, and in such case, the power consumption of the terminal device is relatively high; and when the terminal device is in the sleep state stage, the receiving antenna of the terminal device is turned off to disable the terminal device to receive the DL data packet, and in such case, the terminal device is in a power-saving mode, but the context of the RRC connection is still kept.

The configuration of system resources may be optimized by enabling a terminal device to periodically enter a dormant period and stop monitoring a Physical Downlink Control Channel (PDCCH), and more importantly, power may be reduced without needing the terminal device to enter an RRC idle mode. For example, for some non-real-time applications such as web browsing and instant messaging, there always exists a period of time during which the terminal device is not required to keep monitoring DL data and related processing. Then, DRX may be applied to such a condition. In addition, the RRC connection still exists in this state, and thus the terminal device is required to be switched to the active state very rapidly.

For an existing DRX technology, a network device may configure one or a group of timers for each terminal device through RRC signaling to change an active DRX period. However, such a configuration manner is not flexible and may bring a relatively high signaling overhead.

SUMMARY

Embodiments of the application provide DRX methods and devices, which may flexibly configure a length of a timer for DRX and reduce a signaling overhead.

In a first aspect, a DRX method is provided, which may include that: a first service type is determined by a terminal device, the first service type being a service type of a service which is being transmitted between the terminal device and a network device; a first length is determined by the terminal device according to the first service type; and the first length is determined by the terminal device as a length of a timer for DRX of the first service type.

According to the DRX method of the embodiments of the application, the first length of the timer adopted by the terminal device for DRX is determined through the first service type of a service which is being transmitted between the terminal device and the network device. In such a manner, the length of the timer for DRX may be flexibly configured, which meanwhile is not required to be indicated by the network device in high-layer signaling, and thus a signaling overhead is reduced. Therefore, a user experience is improved.

In a first possible implementation mode of the first aspect, the timer may be at least one of the following timers: an on-duration timer, a DRX inactivity timer, a Hybrid Automatic Repeat reQuest (HARQ) Round Trip Time (RTT) timer and a DRX retransmission timer.

Specifically, the terminal device may configure the four types of timers respectively or configure a part of them only, while the left part is configured by the network device through high-layer signaling. There are no limits made thereto in the embodiments of the application.

In combination with the abovementioned possible implementation mode of the first aspect, in a second possible implementation mode of the first aspect, the operation that the first length is determined by the terminal device according to the first service type may include that: the first length is determined by the terminal device according to the first service type and a first mapping relationship, the first mapping relationship being configured to represent a corresponding relationship between at least one service type and at least one timer length section and the at least one service type including the first service type.

Specifically, the first length may be determined by the terminal device according to the first mapping relationship configured to represent the corresponding relationship between the at least one service type and the at least one timer length section. The first mapping relationship may be specified in advance in a protocol, or transmitted to the terminal device by the network device. There are no limits made thereto in the embodiments of the application.

It is to be understood that, in the first mapping relationship, one service type may correspond to one time length, or correspond to a group of time lengths, or correspond to a section of time length. For the latter two conditions, the terminal device, after determining a group of time lengths or a section of time length, may select any one time length therefrom as the first length. There are no limits made thereto in the embodiments of the application.

In combination with the abovementioned possible implementation modes of the first aspect, in a third possible implementation mode of the first aspect, under the condition that the timer is a DRX inactivity timer, a HARQ RTT timer or a DRX retransmission timer, the at least one service type may correspond to at least one HARQ process Identifier (ID), and the operation that the first length is determined by the terminal device according to the first service type may include that: the terminal device determines a first HARQ process ID according to the first service type, the first HARQ process ID being configured to represent a HARQ process ID corresponding to data transmission; and the first length is determined by the terminal device according to the first HARQ process ID.

Specifically, under the condition that the terminal device receives the scheduling from the network device during the on-duration timer, namely detecting an initially transmitted PDCCH, the terminal device may determine the first HARQ process ID of present HARQ transmission. Since a service type has a corresponding relationship with a HARQ process ID, that is, at least one service type corresponds to at least one HARQ process ID, the HARQ process ID of present HARQ transmission may be determined as the first HARQ process ID by the terminal device according to the present first service type. Then, the first length may be determined by the terminal device according to the first HARQ process ID.

In combination with the abovementioned possible implementation modes of the first aspect, in a fourth possible implementation mode of the first aspect, the operation that the first length is determined by the terminal device according to the first HARQ process ID may include that: the first length is determined by the terminal device according to the first HARQ process ID and a second mapping relationship, the second mapping relationship being configured to represent a corresponding relationship between the at least one HARQ process ID and the at least one timer length section and the at least one HARQ process ID including the first HARQ process ID.

Specifically, the first length may be determined by the terminal device according to the second mapping relationship configured to represent the corresponding relationship between the at least one HARQ process ID and the at least one timer length section. The second mapping relationship may be specified in advance in a protocol, or may be transmitted to the terminal device by the network device. There are no limits made thereto in the embodiments of the application.

It is to be understood that, in the second mapping relationship, one service type may correspond to one time length, one service type may also correspond to a group of time lengths, or one service type may also correspond to a section of time length. For the latter two conditions, the terminal device, after determining a group of time lengths or a section of time length, may select any one time length therefrom as the first length. There are no limits made thereto in the embodiments of the application.

In combination with the abovementioned possible implementation modes of the first aspect, in a fifth possible implementation mode of the first aspect, the operation that the first length is determined by the terminal device according to the first HARQ process ID may include that: a value of t is determined by the terminal device according to the first HARQ process ID and a third mapping relationship, the third mapping relationship being configured to represent a corresponding relationship between the at least one HARQ process ID and t, t being a predetermined time parameter in the third mapping relationship and t being larger than 0; and a product of the first HARQ process ID and t is determined by the terminal device as the first length.

Specifically, the first length may be determined by the terminal device according to the third mapping relationship configured to represent the corresponding relationship between the at least one HARQ process ID and t. The value of t is determined by the terminal device according to the third mapping relationship, and the product of the first HARQ process ID and t is determined by the terminal device as the first length.

In combination with the abovementioned possible implementation modes of the first aspect, in a sixth possible implementation mode of the first aspect, the service type may be classified according to any one of the following information: a Quality of Service (QoS)-flow-ID, a Data Radio Bearer (DRB), a logical channel and a logical channel group.

In some aspects of the application, the terminal device, after determining the first HARQ process ID, may determine the length of the timer for DRX according to a predetermined time parameter n, n being larger than 0. Specifically, a product of the first process ID and n may be determined by the terminal device as the first length. However, there are no limits made thereto in the embodiments of the application.

A second aspect provides another DRX method, which may include that: a network device determines a service type of a service which is being transmitted between the network device and a terminal device as a first service type; the network device determines a first length according to the first service type, the first length being a length adopted by the terminal device for DRX of the first service type; and the network device transmits the first length to the terminal device.

According to the DRX method of the embodiments of the application, the first length of the timer adopted by the terminal device for DRX is determined through the first service type for present service transmission between the terminal device and the network device, and is transmitted by the network device to the terminal device for configuration. In such a manner, the length of the timer for DRX may be flexibly configured. Therefore, a user experience is improved.

In a first possible implementation mode of the second aspect, the timer may be at least one of the following timers: an on-duration timer, a DRX inactivity timer, a HARQ RIF timer and a DRX retransmission timer; and the operation that the network device transmits the first length to the terminal device may include that: the network device transmits the first length and a type of the timer to the terminal device.

In combination with the abovementioned possible implementation mode of the second aspect, in a second possible implementation mode of the second aspect, the operation that the network device determines the first length according to the first service type may include that: the network device determines the first length according to the first service type and a first mapping relationship, the first mapping relationship being configured to represent a corresponding relationship between at least one service type and at least one timer length section and the at least one service type including the first service type.

In combination with the abovementioned possible implementation modes of the second aspect, in a third possible implementation mode of the second aspect, under the condition that the timer is a DRX inactivity timer, a HARQ RTT timer or a DRX retransmission timer, at least one service type may correspond to at least one HARQ process Identifier (ID), and the operation that the network device determines the first length according to the first service type may include that: the network device determines a first HARQ process ID according to the first service type, the first HARQ process ID being configured to represent a HARQ process ID corresponding to data transmission; and the network device determines the first length according to the first HARQ process ID.

In combination with the abovementioned possible implementation modes of the second aspect, in a fourth possible implementation mode of the second aspect, the operation that the network device determines the first length according to the first HARQ process ID may include that: the network device determines the first length according to the first HARQ process ID and a second mapping relationship, the second mapping relationship being configured to represent a corresponding relationship between the at least one HARQ process ID and the at least one timer length section and the at least one HARQ process ID including the first HARQ process ID.

In combination with the abovementioned possible implementation modes of the second aspect, in a fifth possible implementation mode of the second aspect, the operation that the network device determines the first length according to the first HARQ process ID may include that: the network device determines a value of t according to the first HARQ process ID and a third mapping relationship, the third mapping relationship being configured to represent a corresponding relationship between the at least one HARQ process ID and t, t being a predetermined time parameter in the third mapping relationship and t being larger than 0; and the network device determines a product of the first HARQ process ID and t as the first length.

In combination with the abovementioned possible implementation modes of the second aspect, in a sixth possible implementation mode of the second aspect, the service type may be classified according to any one of the following information: a QoS-flow-ID, a DRB, a logical channel and a logical channel group.

In combination with the abovementioned possible implementation modes of the second aspect, in a seventh possible implementation mode of the second aspect, the operation that the network device transmits the first length to the terminal device may include that: the network device transmits the first length to the terminal device through physical-layer signaling.

In combination with the abovementioned possible implementation modes of the second aspect, in an eighth possible implementation mode of the second aspect, the physical-layer signaling may be Downlink Control Information (DCI).

In some aspects of the application, the network device, after determining the first HARQ process ID, may determine the length of the timer for DRX according to a predetermined time parameter n, n being larger than 0. Specifically, a product of the first process ID and n may be determined by the network device as the first length. However, there are no limits made thereto in the embodiments of the application.

A third aspect provides another DRX method, which may include that: a first HARQ process ID sent by a network device is received by a terminal device, the first HARQ process ID being configured to represent a HARQ process ID corresponding to data transmission; a first length is determined by the terminal device according to the first HARQ process ID; and the first length is determined by the terminal device as a length of a timer for DRX of a first service type.

According to the DRX method of the embodiments of the application, the first length of the timer adopted by the terminal device for DRX is determined through the first HARQ process ID for present service transmission between the terminal device and the network device. In such a manner, the length of the timer for DRX may be flexibly configured, and a user experience is improved.

In a first possible implementation mode of the third aspect, the operation that the first length is determined by the terminal device according to the first HARQ process ID may include that: the first length is determined by the terminal device according to the first HARQ process ID and a second mapping relationship, the second mapping relationship being configured to represent a corresponding relationship between at least one HARQ process ID and at least one timer length section and the at least one HARQ process ID including the first HARQ process ID.

In combination with the abovementioned possible implementation mode of the third aspect, in a second possible implementation mode of the third aspect, the operation that the first length is determined by the terminal device according to the first HARQ process ID may include that: a value of t is determined by the terminal device according to the first HARQ process ID and a third mapping relationship, the third mapping relationship being configured to represent a corresponding relationship between the at least one HARQ process ID and t, t being a predetermined time parameter in the third mapping relationship and t being larger than 0; and a product of the first HARQ process ID and t is determined by the terminal device as the first length.

In combination with the abovementioned possible implementation modes of the third aspect, in a third possible implementation mode of the third aspect, the operation that the first HARQ process ID transmitted by the network device is received by the terminal device may include that: HARQ information transmitted by the network device is received by the terminal device, the HARQ information containing the first HARQ process ID.

In some aspects of the application, the terminal device, after receiving the first HARQ process ID, may determine the length of the timer for DRX according to a predetermined time parameter n, n being larger than 0. Specifically, a product of the first process ID and n is determined by the terminal device as the first length. However, there are no limits made thereto in the embodiments of the application.

A fourth aspect provides another DRX method, which may include that: a network device determines a service type of a service which is being transmitted with a terminal device as a first service type; the network device determines a first HARQ process ID according to the first service type, the first HARQ process ID being configured to represent a HARQ process ID corresponding to data transmission; and the network device transmits the first HARQ process ID to the terminal device.

According to the DRX method of the embodiments of the application, the network device determines the first HARQ process ID by the network device according to the first service type for present service transmission with the terminal device and transmits the first HARQ process ID to the terminal device, and then the terminal device may determine a first length of a timer for DRX according to the first HARQ process ID. Therefore, the length of the timer for DRX may be flexibly configured, and a user experience is improved.

In a first possible implementation mode of the fourth aspect, the operation that the network device transmits the first HARQ process ID to the terminal device may include that: the network device transmits HARQ information to the terminal device, the HARQ information containing the first HARQ process ID.

In combination with the abovementioned possible implementation mode of the fourth aspect, in a second possible implementation mode of the fourth aspect, the service type may be classified according to any one of the following information: a QoS-flow-ID, a DRB, a logical channel and a logical channel group.

A fifth aspect provides a DRX device, which is configured to execute the method in the first aspect or any possible implementation modes of the first aspect. Specifically, the device includes units configured to execute the method in the first aspect or any possible implementation modes of the first aspect.

A sixth aspect provides a DRX device, which is configured to execute the method in the second aspect or any possible implementation modes of the second aspect. Specifically, the device includes units configured to execute the method in the second aspect or any possible implementation modes of the second aspect.

A seventh aspect provides a DRX device, which is configured to execute the method in the third aspect or any possible implementation modes of the third aspect. Specifically, the device includes units configured to execute the method in the third aspect or any possible implementation modes of the third aspect.

An eighth aspect provides a DRX device, which is configured to execute the method in the fourth aspect or any possible implementation modes of the fourth aspect. Specifically, the device includes units configured to execute the method in the fourth aspect or any possible implementation modes of the fourth aspect.

A ninth aspect provides a DRX device, which includes a storage unit and a processor. The storage unit is configured to store an instruction, the processor is configured to execute the instruction stored in a memory, and when the processor executes the instruction stored in the memory, such execution enables the processor to execute the method in the first aspect or any possible implementation modes of the first aspect.

A tenth aspect provides a DRX device, which includes a storage unit and a processor. The storage unit is configured to store an instruction, the processor is configured to execute the instruction stored in a memory, and when the processor executes the instruction stored in the memory, such execution enables the processor to execute the method in the second aspect or any possible implementation modes of the second aspect.

An eleventh aspect provides a DRX device, which includes a storage unit and a processor. The storage unit is configured to store an instruction, the processor is configured to execute the instruction stored in a memory, and when the processor executes the instruction stored in the memory, such execution enables the processor to execute the method in the third aspect or any possible implementation modes of the third aspect.

A twelfth aspect provides a DRX device, which includes a storage unit and a processor. The storage unit is configured to store an instruction, the processor is configured to execute the instruction stored in a memory, and when the processor executes the instruction stored in the memory, such execution enables the processor to execute the method in the fourth aspect or any possible implementation modes of the fourth aspect.

A thirteenth aspect provides a computer-readable medium, which is configured to store a computer program, the computer program including an instruction configured to execute the method in the first aspect or any possible implementation modes of the first aspect.

A fourteenth aspect provides a computer-readable medium, which is configured to store a computer program, the computer program including an instruction configured to execute the method in the second aspect or any possible implementation modes of the second aspect.

A fifteenth aspect provides a computer-readable medium, which is configured to store a computer program, the computer program including an instruction configured to execute the method in the third aspect or any possible implementation modes of the third aspect.

A sixteenth aspect provides a computer-readable medium, which is configured to store a computer program, the computer program including an instruction configured to execute the method in the fourth aspect or any possible implementation modes of the fourth aspect.

DETAILED DESCRIPTION

The technical solutions in the embodiments of the application will be described below in combination with the drawings in the embodiments of the application.

The technical solutions of the embodiments of the application may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a future evolved Public Land Mobile Network (PLMN) or a future 5th-Generation (5G) system.

Optionally, the 5G system or network may be called a New Radio (NR) system or network.

Figure 1:
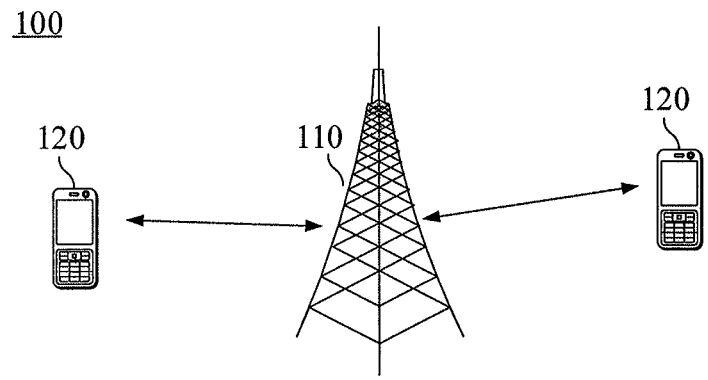
FIG. 1 is a schematic architecture diagram of a wireless communication system to which the embodiments of the application are applied.

FIG. 1 illustrates a wireless communication system 100 to which the embodiments of the application are applied. The wireless communication system 100 may include at least one network device 110. The network device 110 may be a device capable of communicating with a terminal device. Each network device 110 may provide communication coverage for a specific geographical region and may communicate with a terminal device (for example, User Equipment (UE)) in the coverage. The network device 110 may be a Base Transceiver Station (BTS) in the GSM or the CDMA system, or may be a NodeB (NB) in the WCDMA system, or may be an Evolutional Node B (eNB or eNodeB) in the LTE system, or may be a wireless controller in a Cloud Radio Access Network (CRAN). Or the network device may be a relay station, an access point, a vehicle-mounted device, a wearable device, a network device in a future 5G network, a network device in the future evolved PLMN or the like.

The wireless communication system 100 further includes multiple terminal devices 120 within the coverage of the network device 110. The terminal devices 120 may be mobile or fixed. The terminal device 120 may be an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, other processing devices connected to a wireless modem, a vehicle-mounted device, a wearable device, a terminal device in the future 5G network, a terminal device in the future evolved PLMN or the like.

Optionally, the wireless communication system 100 may further include other network entities such as a network controller and a mobility management entity. The embodiments of the application are not limited thereto.

A DRX technology involved in the embodiments of the application will be introduced below.

A packet-based data stream is usually burst. When no data is transmitted, a receiving circuit of a terminal device may be switched off to reduce power consumption, thereby prolonging the service life of a battery. This is how DRX arises. That is, the DRX technology refers to stopping monitoring of a PDCCH within a period of time. There are two types of DRX. One is DRX in RRC_IDLE which, as the name implies, refers to DRX in an idle state of the terminal device. Since there is no RRC connection or UE-specific resource in the idle state, this type is mainly adopted to monitor a calling channel and a broadcast channel, in this case, DRX can be achieved as long as a fixed period is predefined. However, the terminal device, when intended to monitor a user data channel, is required to enter a connected state from the idle state. The other type is DRX in RRC_CONNECTED, i.e., DRX in an RRC connected state of the terminal device. Enabling the terminal device to periodically enter a dormant period and stop monitoring a PDCCH may optimize a system resource configuration and, more importantly, may reduce power, without needing the terminal device to enter the RRC idle mode. For example, for some non-real-time applications such as web browsing and instant messaging, there always exists a period of time during which a mobile phone is not required to keep monitoring DL data and related processing. Then, the DRX technology may be applied to such a condition.

DRX in RRC_CONNECTED may also be called active DRX. An active DRX mechanism allows the terminal device to be periodically switched between a sleep state and an active state in a condition of keeping an RRC connection. The active DRX mechanism divides a connected state of the terminal device into an active state stage and a sleep state stage. When the terminal device is in the active state stage, a receiving antenna of the terminal device is turned on to enable the terminal device to receive a Downlink (DL) data packet, and in such case, the power consumption of the terminal device is relatively high; and when the terminal device is in the sleep state stage, the receiving antenna of the terminal device is turned off to disable the terminal device to receive the DL data packet, and in such case, the terminal device is in a power-saving mode, but the context of the RRC connection is still kept.

For active DRX, four types of timers are involved: an on-duration timer, a DRX inactivity timer, a HARQ RTT timer and a DRX retransmission timer. Functions of the four types of timers will be introduced below respectively.

(1) The On-Duration Timer

Within a time period during which a terminal device keeps awake after waking up from DRX, the terminal device may search for a PDCCH. Within other time period, the terminal device may turn off its receiver and enters a sleep state. Therefore, the on-duration timer represents the number of subframes of the PDCCH required to be monitored by the terminal device within each DRX period.

(2) The DRX Inactivity Timer

When a terminal device receives a scheduling message (indicating the initially transmitted PDCCH) during the on-duration timer, the terminal device may start the DRX inactivity timer and monitors a PDCCH in each DL subframe during the running period of the timer. When another piece of scheduling information (indicating the initially transmitted PDCCH) is received during the running period of the DRX inactivity timer, the terminal device may restart the timer. Within this period, if the PDCCH related to the terminal device is not monitored, the terminal device may enter a sleep state.

(3) The HARQ RTT Timer

HARQ Round Trip Time (RTT) is a minimum time interval, expected by a terminal device, of arrival of DL retransmission. That is, before DL retransmission arrives, the terminal device is temporally not required to pay attention and may be in a sleep state, and after a timeout of the timer, the terminal device is required to be in an awake state. Therefore, the HARQ RTT timer refers to the smallest number of subframes required by the terminal device before retransmission.

(4) The DRX Retransmission Timer

The DRX retransmission timer refers to time, expected by a terminal device, for receiving DL retransmission, that is, the DRX retransmission timer is required to receive DL retransmission. Therefore, the DRX retransmission timer refers to the largest number of subframes of a PDCCH required to be monitored when the terminal device waits for HARQ retransmission. Theoretically, different DRX retransmission timers and HARQ RTT timers may be defined for each non-broadcast HARQ process, and after a timeout of the HARQ RTT timer, the DRX retransmission timer is started.

Figure 2:
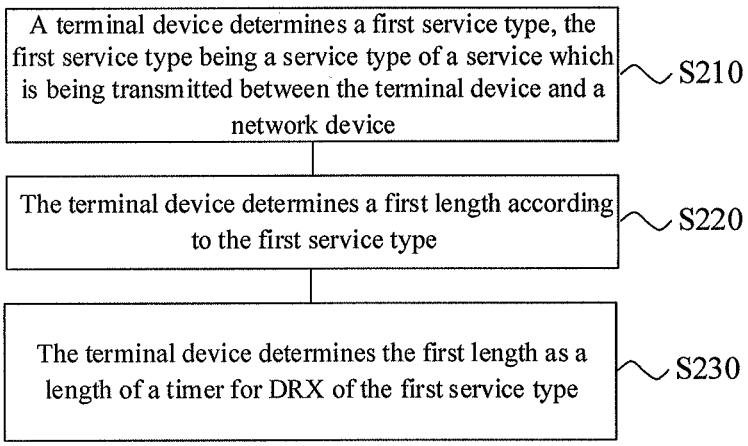
FIG. 2 is a schematic flowchart of a DRX method according to an embodiment of the application.

FIG. 2 is a schematic flowchart of a DRX method 200 according to an embodiment of the application. As shown in FIG. 2, the method 200 includes the following steps.

In S210, a terminal device determines a first service type, the first service type being a service type of a service which is being transmitted between the terminal device and a network device.

In S220, the terminal device determines a first length according to the first service type.

In S230, the first length is determined by the terminal device as a length of a timer for DRX of the first service type.

Specifically, the terminal device may determine the length, called collectively the first length, of the timer for DRX according to the first service type for present service transmission between the terminal device and the network device. Therefore, the length of the timer for DRX may change according to a change in a service type, and timers with different durations may be configured for DRX of the terminal device on the basis of different service types.

According to the DRX method of the embodiment of the application, the first length of the timer adopted by the terminal device for DRX is determined through the first service type corresponding to the service which is presently transmitted between the terminal device and the network device. In such a manner, the length of the timer for DRX may be flexibly configured, which meanwhile, is not required to be indicated by the network device in high-layer signaling, and a signaling overhead is reduced. Therefore, a user experience is improved.

As an optional embodiment, the timer is at least one of the following timers:

an on-duration timer, a DRX inactivity timer, a HARQ RTT timer and a DRX retransmission timer.

Specifically, the terminal device may make configure the four types of timers respectively or configure a part of them only, while the left part is configured by the network device through high-layer signaling. There are no limits made thereto in the embodiment of the application.

It is to be understood that the first length may be determined by the terminal device according to the first service type in multiple manners. There are no limits made thereto in the embodiment of the application. As an optional embodiment, the operation that the first length is determined by the terminal device according to the first service type includes:

the first length is determined by the terminal device according to the first service type and a first mapping relationship, the first mapping relationship being configured to represent a corresponding relationship between at least one service type and at least one timer length, and the at least one service type including the first service type.

Specifically, the first length may be determined by the terminal device according to the first mapping relationship configured to represent the corresponding relationship between the at least one service type and the at least one timer length section. The first mapping relationship may be specified in advance in a protocol, or may be transmitted to the terminal device by a network device. There are no limits made thereto in the embodiment of the application.

It is to be understood that, in the first mapping relationship, one service type may correspond to one time length, or correspond to a group of time lengths, or correspond to a section of time length. For the latter two conditions, the terminal device, after determining a group of time lengths or a section of time length, may select any one time length therefrom as the first length. There are no limits made thereto in the embodiment of the application.

As an optional embodiment, under the condition that the timer is a DRX inactivity timer, a HARQ RTT timer or a DRX retransmission timer, the at least one service type corresponds to at least one HARQ process ID, and the operation that the first length is determined by the terminal device according to the first service type includes:

a first HARQ process ID is determined by the terminal device according to the first service type, the first HARQ process ID being configured to represent a HARQ process ID corresponding to data transmission; and the first length is determined by the terminal device according to the first. HARQ process ID.

Specifically, the first HARQ process ID of present HARQ transmission may be determined by the terminal device under the condition that the terminal device receives the scheduling from the network device during the on-duration timer period, namely detecting an initially transmitted PDCCH. Since a service type has a corresponding relationship with a HARQ process ID, that is, the at least one service type corresponds to the at least one HARQ process ID, the HARQ process ID of present HARQ transmission may be determined by the terminal device as the first HARQ process ID according to the present first service type. Then, the first length may be determined by the terminal device according to the first HARQ process ID.

It is to be understood that the first length may be determined by the terminal device according to the first HARQ process ID in multiple manners. There are no limits made thereto in the embodiment of the application. As an optional embodiment, the operation that the first length is determined by the terminal device according to the first HARQ process ID includes:

the first length is determined by the terminal device according to the first HARQ process ID and a second mapping relationship, the second mapping relationship being configured to represent a corresponding relationship between the at least one HARQ process ID and the at least one timer length section and the at least one HARQ process ID including the first HARQ process ID.

Specifically, the first length may be determined by the terminal device according to the second mapping relationship configured to represent the corresponding relationship between the at least one HARQ process ID and the at least one timer length section. The second mapping relationship may be specified in advance in a protocol, or may be a mapping relationship which is transmitted to the terminal device by a network device. There are no limits made thereto in the embodiment of the application.

It is to be understood that, in the second mapping relationship, one service type may correspond to one time length, or correspond to a group of time lengths, or correspond to a section of time length. For the latter two conditions, the terminal device, after determining a group of time lengths or a section of time length, may select any one time length therefrom as the first length. There are no limits made thereto in the embodiment of the application.

As an optional embodiment, the operation that the first length is determined by the terminal device according to the first HARQ process ID includes:

a value oft is determined by the terminal device according to the first HARQ process ID and a third mapping relationship, the third mapping relationship being configured to represent a corresponding relationship between the at least one HARQ process ID and t, t being a predetermined time parameter in the third mapping relationship and t being larger than 0; and a product of the first HARQ process ID and t is determined by the terminal device as the first length.

Specifically, the first length may be determined by the terminal device according to the third mapping relationship configured to represent the corresponding relationship between the at least one HARQ process ID and t. the value of t is determined by the terminal device according to the third mapping relationship, and the product of the first HARQ process ID and t is then determined by the terminal device as the first length.

As an optional embodiment, the service type is classified according to any one of the following information:

a QoS-flow-ID, a Data Radio Bear (DRB), a logical channel and a logical channel group.

It is to be understood that magnitudes of sequence numbers of each process are not intended to represent an execution sequence, and the execution sequence of each process should be determined by their functions and internal logic but shall not form any limit to an implementation process of the embodiments of the application.

Figure 3:
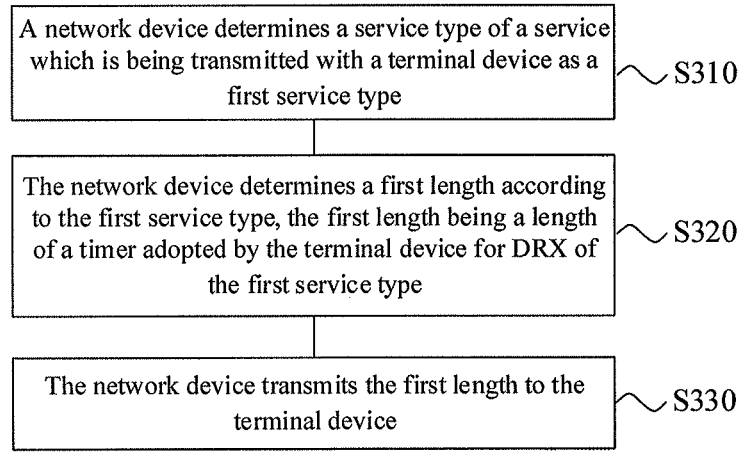
FIG. 3 is a schematic flowchart of another DRX method according to an embodiment of the application.

FIG. 3 is a schematic flowchart of another DRX method 300 according to an embodiment of the application. As shown in FIG. 3, the method 300 includes the following steps.

In S310, a network device determines a service type of a service which is being transmitted between the network device and a terminal device as a first service type.

In S320, the network device determines a first length according to the first service type, the first length being a length of a timer adopted by the terminal device for DRX of the first service type.

In S330, the network device transmits the first length to the terminal device.

Specifically, the network device may determine the first length according to the first service type of the service which is presently transmitted between the terminal device and the network device. Therefore, the length of the timer for DRX may change according to a change in a service type, and in the embodiment of the application, the network device may configure timers with different durations for DRX of the terminal device on the basis of different service types.

According to the DRX method of the embodiment of the application, the first length of the timer adopted by the terminal device for DRX is determined through the first service type for present service transmission between the terminal device and the network device, and the first length is transmitted by the network device to the terminal device for configuration. In such a manner, the length of the timer for DRX may be flexibly configured. Therefore, a user experience is improved.

As an optional embodiment, the timer is at least one of the following timers:

an on-duration timer, a DRX inactivity timer, a HARQ RTT timer and a DRX retransmission timer.

The operation that the first length is transmitted by the network device to the terminal device includes:

the first length and the type of the timer are transmitted by the network device to the terminal device.

Specifically, the network device may configure all or part of the four types of timers respectively and transmit configured first lengths and the timer types corresponding to the first lengths to the terminal device.

It is to be understood that the network device may determine the first length according to the first service type in multiple manners. There are no limits made thereto in the embodiment of the application. As an optional embodiment, the operation that the first length is determined by the network device according to the first service type includes:

the first length is determined by the network device according to the first service type and a first mapping relationship, the first mapping relationship being configured to represent a corresponding relationship between at least one service type and at least one timer length section and the at least one service type including the first service type.

Specifically, the first length may be determined by the network device according to the first mapping relationship configured to represent the corresponding relationship between the at least one service type and the at least one timer length section. The first mapping relationship may be specified in advance in a protocol.

It is to be understood that, in the first mapping relationship, one service type may correspond to one time length, or correspond to a group of time lengths, or correspond to a section of time length. For the latter two conditions, the network device, after determining a group of time lengths or a section of time length, may select any one time length therefrom as the first length. There are no limits made thereto in the embodiment of the application.

As an optional embodiment, under the condition that the timer is a DRX inactivity timer, a HARQ RTT timer or a DRX retransmission timer, at least one service type corresponds to at least one HARQ process ID.

The operation that the first length is determined by the network device according to the first service type includes:

a first HARQ process ID is determined by the network device according to the first service type, the first HARQ process ID being configured to represent a HARQ process ID corresponding to data transmission; and the first length is determined by the network device according to the first HARQ process ID.

Specifically, the first HARQ process ID of present HARQ transmission may be determined by the network device under the condition that the terminal device receives the scheduling from the network device during the on-duration timer period, namely detecting an initially transmitted PDCCH. Since a service type has a corresponding relationship with a HARQ process ID, that is, at least one service type corresponds to the at least one HARQ process ID, the HARQ process ID of present HARQ transmission may be determined by the network device as the first HARQ process ID according to the present first service type. Then, the first length may be determined by the network device according to the first HARQ process ID.

It is to be understood that the first length may be determined by the network device according to the first HARQ process ID in multiple manners. There are no limits made thereto in the embodiment of the application. As an optional embodiment, the operation that the first length is determined by the network device according to the first HARQ process ID includes:

the first length is determined by the network device according to the first HARQ process ID and a second mapping relationship, the second mapping relationship being configured to represent a corresponding relationship between the at least one HARQ process ID and the at least one timer length section and the at least one HARQ process ID including the first HARQ process ID.

Specifically, the first length may be determined by the network device according to the second mapping relationship configured to represent the corresponding relationship between the at least one HARQ process ID and the at least one timer length section. The second mapping relationship may be specified in advance in a protocol.

It is to be understood that, in the second mapping relationship, one service type may correspond to one time length, or correspond to a group of time lengths, or correspond to a section of time length. For the latter two conditions, the network device, after determining a group of time lengths or a section of time length, may select any one time length therefrom as the first length. There are no limits made thereto in the embodiment of the application.

As an optional embodiment, the operation that the first length is determined by the network device according to the first HARQ process ID includes:

a value of t is determined by the network device according to the first HARQ process ID and a third mapping relationship, the third mapping relationship being configured to represent a corresponding relationship between the at least one HARQ process ID and t, t being a predetermined time parameter in the third mapping relationship and t being larger than 0; and a product of the first HARQ process ID and t is determined by the network device as the first length.

Specifically, the first length may be determined by the network device according to the third mapping relationship configured to represent the corresponding relationship between the at least one HARQ process ID and t. The value of t is determined by the network device according to the third mapping relationship, and then the product of the first HARQ process ID and t is determined by the network device as the first length.

As an optional embodiment, the service type is classified according to any one of the following information:

a QoS-flow-ID, a DRB, a logical channel and a logical channel group.

As an optional embodiment, the operation that the first length is transmitted by the network device to the terminal device includes:

the first length is transmitted by the network device to the terminal device through physical-layer signaling.

As an optional embodiment, the physical-layer signaling is DCI.

In such a manner, the length of the timer adopted by the terminal device for DRX may be dynamically indicated by the network device through the physical-layer signaling, which, compared with through high-layer RRC signaling, reduces a signaling overhead.

It is to be understood that magnitudes of sequence numbers of each process are not intended to represent an execution sequence and the execution sequence of each process should be determined by their functions and internal logic but shall not form any limit to an implementation process of the embodiments of the application.

Figure 4:
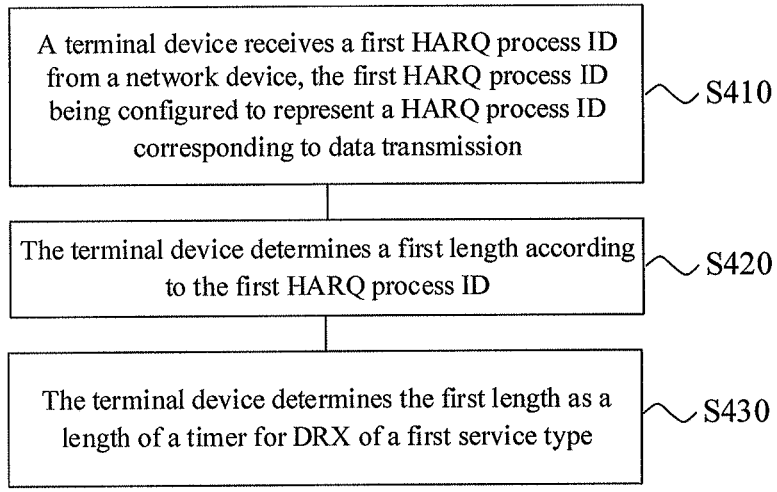
FIG. 4 is a schematic flowchart of another DRX method according to an embodiment of the application.

FIG. 4 is a schematic flowchart of another DRX method 400 according to an embodiment of the application. As shown in FIG. 4, the method 400 includes the following steps.

In S410, a first HARQ process ID is received by a terminal device from a network device, the first HARQ process ID being configured to represent a HARQ process ID corresponding to data transmission.

In S420, a first length is determined by the terminal device according to the first HARQ process ID.

In S430, the first length is determined by the terminal device as a length of a timer for DRX of a first service type.

Specifically, the first length may be determined by the terminal device for DRX according to the first HARQ process ID of present HARQ transmission between the terminal device and the network device. Therefore, the length of the timer for DRX may change according to a change in a HARQ process ID, and timers with different durations may be configured for DRX of the terminal device on the basis of different HARQ process IDs.

According to the DRX method of the embodiment of the application, the first length of the timer adopted by the terminal device for DRX is determined through the first HARQ process ID for present service transmission between the terminal device and the network device. In such a manner, the length of the timer for DRX may be flexibly configured, and a user experience is improved.

As an optional embodiment, the timer is at least one of the following timers:

a DRX inactivity timer, a HARQ RTT timer and a DRX retransmission timer.

As an optional embodiment, the operation that the first length is determined by the terminal device according to the first HARQ process ID includes:

the first length is determined by the terminal device according to the first HARQ process ID and a second mapping relationship, the second mapping relationship being configured to represent a corresponding relationship between at least one HARQ process ID and at least one timer length section and the at least one HARQ process ID including the first HARQ process ID.

As an optional embodiment, the operation that the first length is determined by the terminal device according to the first HARQ process ID includes:

a value of t is determined by the terminal device according to the first HARQ process ID and a third mapping relationship, the third mapping relationship being configured to represent a corresponding relationship between the at least one HARQ process ID and t, t being a predetermined time parameter in the third mapping relationship and t being larger than 0.

The product of the first HARQ process ID and t is determined by the terminal device as the first length.

Figure 5:
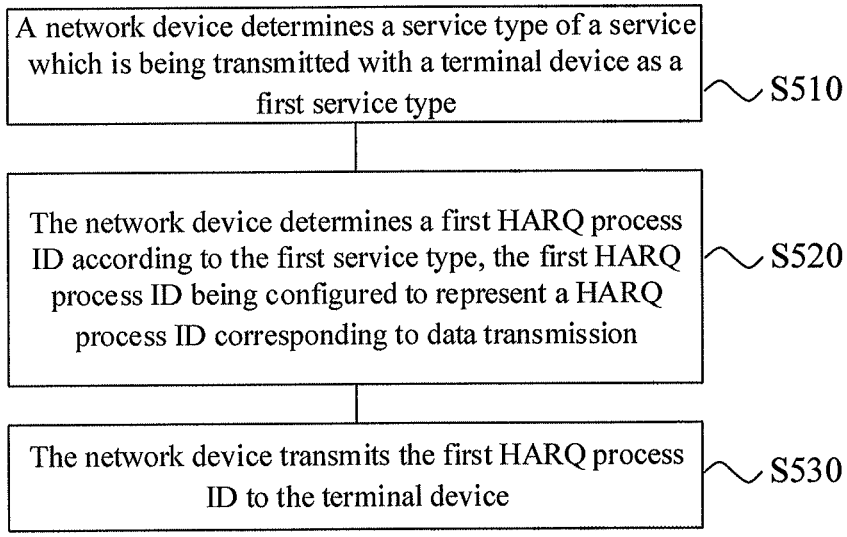
FIG. 5 is a schematic flowchart of another DRX method according to an embodiment of the application.

FIG. 5 is a schematic flowchart of another DRX method 500 according to an embodiment of the application. As shown in FIG. 5, the method 500 includes the following steps.

In S510, a network device determines a service type of a service which is being transmitted with a terminal device as a first service type.

In S520, the network device determines a first HARQ process ID according to the first service type, the first HARQ process ID being configured to represent a HARQ process ID corresponding to data transmission.

In S530, the network device transmits the first HARQ process ID to the terminal device.

Specifically, the network device may determine the first service type for present transmission with the terminal device, then determine the first HARQ process ID according to the first service type and transmit the first HARQ process ID to the terminal device to enable the terminal device to determine a length of a timer for DRX according to the first HARQ process ID.

According to the DRX method of the embodiment of the application, the network device determines the first HARQ process ID according to the first service type for present service transmission with the terminal device and transmits the first HARQ process ID to the terminal device, and then the terminal device can determine the first length of the timer for DRX according to the first HARQ process ID. Therefore, the length of the timer for DRX may be flexibly configured, and a user experience is improved.

As an optional embodiment, the operation that the network device transmits the first HARQ process ID to the terminal device includes:

the network device transmits HARQ information to the terminal device, the HARQ information containing the first HARQ process ID.

Correspondingly, the operation that the terminal device receives the first HARQ process ID transmitted by the network device includes:

the terminal device receives the HARQ information from the network device, the HARQ information containing the first HARQ process ID.

As an optional embodiment, the service type is classified according to any one of the following information:

a QoS-flow-ID, a DRB, a logical channel and a logical channel group.

It is also to be understood that magnitudes of sequence numbers of each process are not intended to represent an execution sequence. The execution sequence of each process should be determined by their functions and internal logic but shall not form any limit to an implementation process of the embodiments of the application.

The DRX methods according to the embodiments of the application are described above in combination with FIG. 1 and FIG. 5 in detail. DRX devices according to the embodiments of the application will be described below in combination with FIG. 6 to FIG. 13 in detail.

Figure 6:
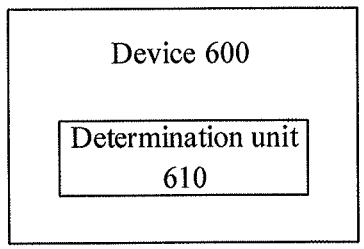
FIG. 6 is a schematic block diagram of a DRX device according to an embodiment of the application.

FIG. 6 illustrates a DRX device 600 according to an embodiment of the application. The device 600 includes a determination unit 610.

The determination unit 610 is configured to: determine a first service type, the first service type being the type of a service which is being transmitted between a terminal device and a network device; determine a first length according to the first service type; and determine the first length as a length of a timer for DRX of the first service type.

Optionally, the timer is at least one of the following timers: an on-duration timer, a DRX inactivity timer, a HARQ RTT timer and a DRX retransmission timer.

Optionally, the determination unit 610 is configured to determine the first length according to the first service type and a first mapping relationship, the first mapping relationship being configured to represent a corresponding relationship between at least one service type and at least one timer length section and the at least one service type including the first service type.

Optionally, under the condition that the timer is a DRX inactivity timer, a HARQ RTT timer or a DRX retransmission timer, at least one service type corresponds to at least one HARQ process ID, and the determination unit 610 is configured to determine a first HARQ process ID according to the first service type, the first HARQ process ID being configured to represent a HARQ process ID corresponding to data transmission, and determine the first length according to the first HARQ process ID.

Optionally, the determination unit 610 is configured to determine the first length according to the first HARQ process ID and a second mapping relationship, the second mapping relationship being configured to represent a corresponding relationship between the at least one HARQ process ID and the at least one timer length section and the at least one HARQ process ID including the first HARQ process ID.

Optionally, the determination unit 610 is configured to: determine a value of t according to the first HARQ process ID and a third mapping relationship, the third mapping relationship being configured to represent a corresponding relationship between the at least one HARQ process ID and t, t being a predetermined time parameter in the third mapping relationship and t being larger than 0; and determine a product of the first HARQ process ID and t as the first length.

Optionally, the service type is classified according to any one of the following information: a QoS-flow-ID, a DRB, a logical channel and a logical channel group.

In an optional example, those skilled in the art may understand that the device 600 may be the terminal device in the embodiment 200 and the device 600 may be configured to execute each flow and/or step corresponding to the terminal device in the method embodiment 200, which will not be elaborated herein for avoiding repetitions.

Figure 7:
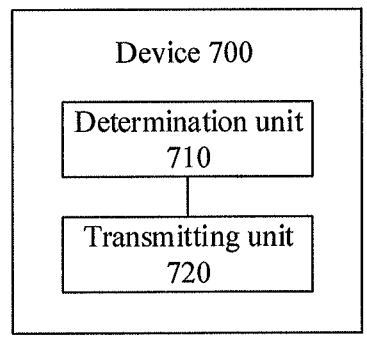
FIG. 7 is a schematic block diagram of another DRX device according to an embodiment of the application.

FIG. 7 illustrates another DRX device 700 according to an embodiment of the application. The device 700 includes a determination unit 710 and a transmitting unit 720.

The determination unit 710 is configured to determine a service type of a service which is being transmitted with a terminal device as a first service type and determine a first length according to the first service type, the first length being a length of a timer adopted by the terminal device for DRX of the first service type.

The transmitting unit 720 is configured to transmit the first length to the terminal device.

Optionally, the timer is at least one of the following timers: an on-duration timer, a DRX inactivity timer, a HARQ RTT timer and a DRX retransmission timer; and the transmitting unit 720 is configured to transmit the first length and a type of the timer to the terminal device.

Optionally, the determination unit 710 is configured to determine the first length according to the first service type and a first mapping relationship, the first mapping relationship being configured to represent a corresponding relationship between at least one service type and at least one timer length section and the at least one service type including the first service type.

Optionally, under the condition that the timer is the DRX inactivity timer, the HARQ RTT timer or the DRX retransmission timer, the at least one service type corresponds to at least one HARQ process ID. The determination unit 710 is configured to: determine a first HARQ process ID according to the first service type, the first HARQ process ID being configured to represent a HARQ process ID corresponding to data transmission; and determine the first length according to the first HARQ process ID.

Optionally, the determination unit 710 is configured to determine the first length according to the first HARQ process ID and a second mapping relationship, the second mapping relationship being configured to represent a corresponding relationship between the at least one HARQ process ID and the at least one timer length section and the at least one HARQ process ID including the first HARQ process ID.

Optionally, the determination unit 710 is configured to: determine a value of t according to the first HARQ process ID and a third mapping relationship, the third mapping relationship being configured to represent a corresponding relationship between the at least one HARQ process ID and t, t being a predetermined time parameter in the third mapping relationship and t being larger than 0; and determine a product of the first HARQ process ID and t as the first length.

Optionally, the service type is classified according to any one of the following information: a QoS-flow-ID, a DRB, a logical channel and a logical channel group.

Optionally, the transmitting unit 720 is configured to transmit the first length to the terminal device through physical-layer signaling.

Optionally, the physical-layer signaling is DCI.

In an optional example, those skilled in the art may understand that the device 700 may be the network device in the embodiment 300 and the device 700 may be configured to execute each flow and/or step corresponding to the network device in the method embodiment 300, which will not be elaborated herein for avoiding repetitions.

Figure 8:
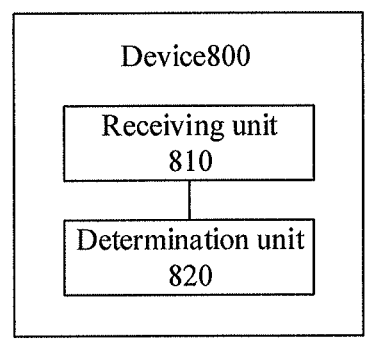
FIG. 8 is a schematic block diagram of another DRX device according to an embodiment of the application.

FIG. 8 illustrates another DRX device 800 according to an embodiment of the application. The device 800 includes a receiving unit 810 and a determination unit 820.

The receiving unit 810 is configured to receive a first HARQ process ID sent by a network device, the first HARQ process ID being configured to represent a HARQ process ID corresponding to data transmission.

The determination unit 820 is configured to determine a first length according to the first HARQ process ID and determine the first length as a length of a timer for DRX of a first service type.

Optionally, the determination unit 820 is configured to determine the first length according to the first HARQ process ID and a second mapping relationship, the second mapping relationship being configured to represent a corresponding relationship between at least one HARQ process ID and at least one timer length section and the at least one HARQ process ID including the first HARQ process ID.

Optionally, the determination unit 820 is configured to determine a value of t according to the first HARQ process ID and a third mapping relationship, the third mapping relationship being configured to represent a corresponding relationship between the at least one HARQ process ID and t, t being a predetermined time parameter in the third mapping relationship and t being larger than 0, and determine a product of the first HARQ process ID and t as the first length.

Optionally, the timer is at least one of the following timers:

a DRX inactivity timer, a HARQ RTT timer and a DRX retransmission timer.

Optionally, the receiving unit 810 is configured to receive HARQ information from the network device, the HARQ information containing the first HARQ process ID.

In an optional example, those skilled in the art may understand that the device 800 may be the terminal device in the embodiment 400 and the device 800 may be configured to execute each flow and/or step corresponding to the terminal device in the method embodiment 400, which will not be elaborated herein for avoiding repetitions.

Figure 9:
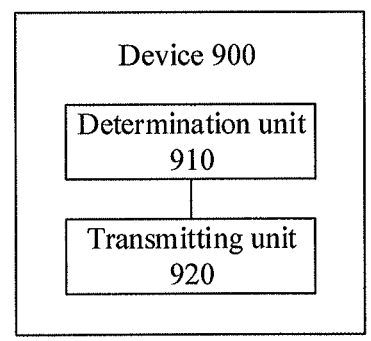
FIG. 9 is a schematic block diagram of another DRX device according to an embodiment of the application.

FIG. 9 illustrates another DRX device 900 according to an embodiment of the application. The device 900 includes a determination unit 910 and a transmitting unit 920.

The determination unit 910 is configured to determine a service type for service transmission with a terminal device as a first service type and determine a first HARQ process ID according to the first service type, the first HARQ process ID being configured to represent a HARQ process ID corresponding to data transmission.

The transmitting unit 920 is configured to transmit the first HARQ process ID to the terminal device.

Optionally, the transmitting unit 920 is configured to transmit HARQ information to the terminal device, the HARQ information containing the first HARQ process ID.

Optionally, the service type is classified according to any one of the following information: a QoS-flow-ID, a DRB, a logical channel and a logical channel group.

In an optional example, those skilled in the art may understand that the device 900 may be the network device in the embodiment 500 and the device 900 may be configured to execute each flow and/or step corresponding to the network device in the method embodiment 500, which will not be elaborated herein for avoiding repetitions.

It is to be understood that the device 600, the device 700, the device 800 and the device 900 may be embodied in form of functional units. Term "unit" mentioned herein may refer to an Application Specific Integrated Circuit (ASIC), an electronic circuit, a processor (for example, a shared processor, a dedicated processor or a group processor) and memory configured to execute one or more software or firmware programs, a merged logic circuit and/or other proper components supporting the described functions.

Figure 10:
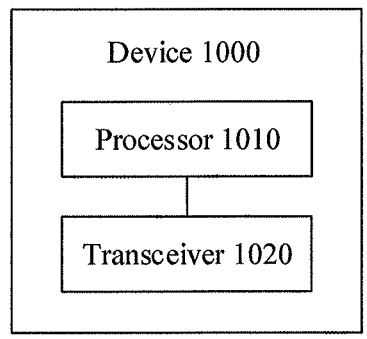
FIG. 10 is a schematic block diagram of another DRX device according to an embodiment of the application.

FIG. 10 is a schematic block diagram of a device 1000 according to an embodiment of the application. As shown in FIG. 10, the device 1000 includes a processor 1010 and a transceiver 1020.

Herein, the processor 1010 is configured to determine a first service type, the first service type being the type of a service which is being transmitted between a terminal device and a network device, determine a first length according to the first service type and determine the first length as a length of a timer for DRX of the first service type.

In an optional example, those skilled in the art may understand that the device 1000 may be the terminal device in the embodiment 200 and the device 1000 may be configured to execute each flow and/or step corresponding to the terminal device in the method embodiment 200, which will not be elaborated herein for avoiding repetitions.

Optionally, the device 1000 may further include a memory. The memory may include a Read-Only Memory (ROM) and a Random Access Memory (RAM) and provide an instruction and data for the processor. A part of the memory may further include a nonvolatile RAM. For example, the memory may further store information of a device type. The processor 1010 may be configured to execute the instruction stored in the memory, and when the processor executes the instruction, the processor may execute each step corresponding to the network device in the abovementioned method embodiments.

Figure 11:
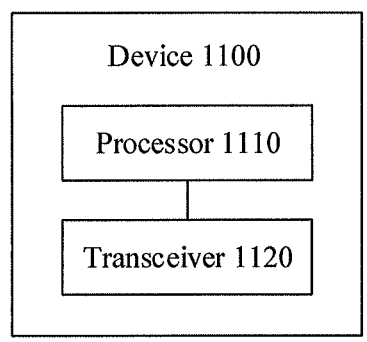
FIG. 11 is a schematic block diagram of another DRX device according to an embodiment of the application.

FIG. 11 is a schematic block diagram of a device 1100 according to an embodiment of the application. As shown in FIG. 11, the device 1100 includes a processor 1110 and a transceiver 1120.

Herein, the processor 1110 is configured to determine a service type of a service which is being transmitted with a terminal device as a first service type and determine a first length according to the first service type, the first length being a length of a timer adopted by the terminal device for DRX of the first service type.

The transceiver 1120 is configured to transmit the first length to the terminal device.

In an optional example, those skilled in the art may understand that the device 1100 may be the terminal device in the embodiment 300 and the device 1100 may be configured to execute each flow and/or step corresponding to the terminal device in the method embodiment 300, which will not be elaborated herein for avoiding repetitions.

Optionally, the device 1100 may further include a memory. The memory may include a ROM and a RAM and provides an instruction and data for the processor. A part of the memory may further include a nonvolatile RAM. For example, the memory may further store information of a device type. The processor 1110 may be configured to execute the instruction stored in the memory, and when the processor executes the instruction, the processor may execute each step corresponding to the network device in the abovementioned method embodiments.

Figure 12:
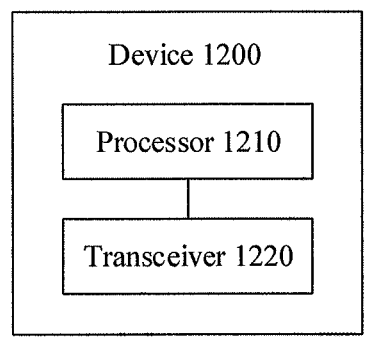
FIG. 12 is a schematic block diagram of another DRX device according to an embodiment of the application.

FIG. 12 is a schematic block diagram of a device 1200 according to an embodiment of the application. As shown in FIG. 12, the device 1200 includes a processor 1210 and a transceiver 1220.

Herein, the transceiver 1220 is configured to receive a first HARQ process ID transmitted by a network device, the first HARQ process ID being configured to represent a HARQ process ID corresponding to data transmission.

The processor 1210 is configured to determine a first length according to the first HARQ process ID and determine the first length as a length of a timer for DRX of a first service type.

In an optional example, those skilled in the art may understand that the device 1200 may be the terminal device in the embodiment 400 and the device 1200 may be configured to execute each flow and/or step corresponding to the terminal device in the method embodiment 400, which will not be elaborated herein for avoiding repetitions.

Optionally, the device 1200 may further include a memory. The memory may include a ROM and a RAM and provide an instruction and data to the processor. A part of the memory may further include a nonvolatile RAM. For example, the memory may further store information of a device type. The processor 1210 may be configured to execute the instruction stored in the memory, and when the processor executes the instruction, the processor may execute each step corresponding to the network device in the abovementioned method embodiments.

Figure 13:
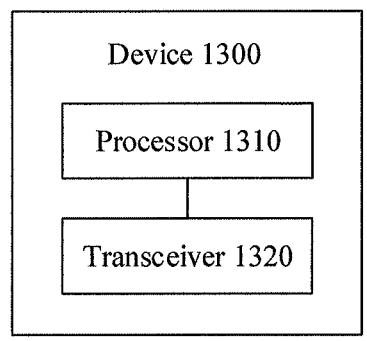
FIG. 13 is a schematic block diagram of another DRX device according to an embodiment of the application.

FIG. 13 is a schematic block diagram of a device 1300 according to an embodiment of the application. As shown in FIG. 13, the device 1300 includes a processor 1310 and a transceiver 1320.

Here, the processor 1310 is configured to determine a service type for service transmission with a terminal device as a first service type and determine a first HARQ process ID according to the first service type, the first HARQ process ID being configured to represent a HARQ process ID corresponding to data transmission.

The transceiver 1320 is configured to transmit the first HARQ process ID to the terminal device.

In an optional example, those skilled in the art may understand that the device 1300 may be the terminal device in the embodiment 500 and the device 1300 may be configured to execute each flow and/or step corresponding to the terminal device in the method embodiment 500, which will not be elaborated herein for avoiding repetitions.

Optionally, the device 1300 may further include a memory. The memory may include a ROM and a RAM and provide an instruction and data for the processor. A part of the memory may further include a nonvolatile RAM. For example, the memory may further store information of a device type. The processor 1310 may be configured to execute the instruction stored in the memory, and when the processor executes the instruction, the processor may execute each step corresponding to the network device in the abovementioned method embodiments.

It is to be understood that, in the embodiments of the application, the processor may be a Central Processing Unit (CPU), and the processor may be a universal processor, a Digital Signal Processor (DSP), an ASIC, a Field-Programmable Gate Array (FPGA) or other programmable logic device, discrete gate or transistor logic device or discrete hardware component and the like. The universal processor may be a microprocessor or any conventional processor and the like.

In an implementation process, each step of the methods may be completed by an integrated logic circuit of hardware in a processor or an instruction in a software form. The steps of the methods disclosed in combination with the embodiments of the application may be directly embodied to be executed and completed by a hardware processor or executed and completed by a combination of hardware and software modules in a processor. The software module may be located in a mature storage medium in this field such as a RAM, a flash memory, a ROM, a programmable ROM or electrically erasable programmable ROM and a register. The storage medium is located in a memory, and the processor reads the instruction in the memory and completes the steps of the method in combination with hardware. No more detailed descriptions will be made herein to avoid repetitions.

It is to be understood that term "and/or" in the disclosure represents only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in various embodiments of the application, a magnitude of a sequence number of each process does not mean an execution sequence and the execution sequence of each process should be determined by its function and an internal logic and should not form any limit to an implementation process of the embodiments of the application.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, devices and methods may be implemented in other manners. For example, the device embodiments described above are only schematic, and for example, division of the units is only logic function division, and other division manners may be adopted in practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional units and sold or used as an independent product, the functions may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the application. The abovementioned storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A Discontinuous Reception (DRX) method, comprising:
determining, by a terminal device, a first service type, wherein the first service type is a service type of a service which is being transmitted between the terminal device and a network device;
determining, by the terminal device, a first length according to the first service type without being indicated by the network device through high-layer signaling; and
determining, by the terminal device, the first length as a length of a timer for DRX of the first service type;
wherein determining, by the terminal device, the first length according to the first service type comprises:
selecting, by the terminal device, the first length from a timer length section corresponding to the first service type according to a first mapping relationship, wherein the first mapping relationship is configured to represent a corresponding relationship between at least one service type and at least one timer length section, the first mapping relationship is specified in advance in a protocol, and the at least one service type comprises the first service type;
wherein, under a condition that the timer is a DRX inactivity timer, a HARQ RTT timer or a DRX retransmission timer, the at least one service type corresponds to at least one HARQ process Identifier (ID), and
determining, by the terminal device, the first length according to the first service type comprises:
determining, by the terminal device, a first HARQ process ID according to the first service type, wherein the first HARQ process ID is configured to represent a HARQ process ID corresponding to data transmission; and
determining, by the terminal device, the first length according to the first HARQ process ID.

2. The method of claim 1, wherein the timer is at least one of following timers:
an on-duration timer, a DRX inactivity timer, a Hybrid Automatic Repeat reQuest (HARQ) Round Trip Time (RTT) timer and a DRX retransmission timer.

3. The method of claim 1, wherein determining, by the terminal device, the first length according to the first HARQ process ID comprises:
determining, by the terminal device, the first length according to the first HARQ process ID and a second mapping relationship, wherein the second mapping relationship is configured to represent a corresponding relationship between the at least one HARQ process ID and the at least one timer length section, and the at least one HARQ process ID comprises the first HARQ process ID.

4. The method of claim 1, wherein the service type is classified according to any one of following information:
a Quality of Service (QoS)-flow-ID, a Data Radio Bearer (DRB), a logical channel and a logical channel group.

5. A Discontinuous Reception (DRX) device, comprising:
a processor, and
a memory configured to store instructions executable by the processor;
wherein the processor is configured to execute the instructions to implement a method comprising:
determining, by a terminal device, a first service type, wherein the first service type is a service type of a service which is being transmitted between the terminal device and a network device;
determining, by the terminal device, a first length according to the first service type without being indicated by the network device through high-layer signaling; and
determining, by the terminal device, the first length as a length of a timer for DRX of the first service type;
wherein determining, by the terminal device, the first length according to the first service type comprises:
selecting, by the terminal device, the first length from a timer length section corresponding to the first service type according to a first mapping relationship, wherein the first mapping relationship is configured to represent a corresponding relationship between at least one service type and at least one timer length section, the first mapping relationship is specified in advance in a protocol, and the at least one service type comprises the first service type;
wherein under a condition that the timer is a DRX inactivity timer, a HARQ RTT timer or a DRX retransmission timer, the at least one service type corresponds to at least one HARQ process Identifier (ID), and
the processor is configured to:
determine a first HARQ process ID according to the first service type, wherein the first HARQ process ID is configured to represent a HARQ process ID corresponding to data transmission, and
determine the first length according to the first HARQ process ID.

6. The device of claim 5, wherein the timer is at least one of following timers:
an on-duration timer, a DRX inactivity timer, a Hybrid Automatic Repeat reQuest (HARQ) Round Trip Time (RTT) timer and a DRX retransmission timer.

7. The device of claim 5, wherein the processor is configured to:
determine the first length according to the first HARQ process ID and a second mapping relationship, wherein the second mapping relationship is configured to represent a corresponding relationship between the at least one HARQ process ID and the at least one timer length section, and the at least one HARQ process ID comprises the first HARQ process ID.

8. The device of claim 5, wherein the service type is classified according to any one of following information:
a Quality of Service (QoS)-flow-ID, a Data Radio Bearer (DRB), a logical channel and a logical channel group.

* * * * *